United States Patent
Takehara et al.

[11] Patent Number: 5,804,896
[45] Date of Patent: Sep. 8, 1998

[54] HIGH SPEED SPINDLE MOTOR AND APPARATUS EQUIPPED WITH HIGH SPEED SPINDLE MOTOR

[75] Inventors: Isamu Takehara, Chiba; Masashi Ogawa; Hirotada Shimaguchi, both of Narashino, all of Japan

[73] Assignee: Seiko Seiki Kabushiki Kaisha, Japan

[21] Appl. No.: 575,144

[22] Filed: Dec. 19, 1995

[30] Foreign Application Priority Data

Dec. 21, 1994 [JP] Japan ................................ 6-335815

[51] Int. Cl.⁶ .......................... H02K 7/00; H02K 11/00
[52] U.S. Cl. ................. 310/67 R; 310/156; 310/179; 310/181; 310/254; 316/259
[58] Field of Search ................. 310/67 R, 156, 310/254, 259, 179, 181

[56] References Cited

U.S. PATENT DOCUMENTS

| | | | |
|---|---|---|---|
| 3,622,823 | 11/1971 | Broadway et al. | 310/254 |
| 3,652,889 | 3/1972 | Reece et al. | 310/259 |
| 4,144,469 | 3/1979 | Miyashi et al. | 310/156 |
| 4,386,287 | 5/1983 | Karasawa et al. | 310/49 R |
| 4,533,891 | 8/1985 | Vanderlaan et al. | 335/272 |
| 4,742,258 | 5/1988 | Earle et al. | 310/156 |
| 4,795,936 | 1/1989 | Crosetto et al. | 310/156 |
| 4,902,924 | 2/1990 | Ushiro et al. | 310/268 |
| 5,041,749 | 8/1991 | Gaser et al. | 310/156 |
| 5,166,567 | 11/1992 | Kneisley et al. | 310/216 |
| 5,319,844 | 6/1994 | Huang et al. | 29/598 |
| 5,323,077 | 6/1994 | Brandes | 310/156 |
| 5,498,917 | 3/1996 | Ninomiya et al. | 310/216 |

Primary Examiner—Steven L. Stephan
Assistant Examiner—Elvin G. Enad
Attorney, Agent, or Firm—Adams & Wilks

[57] ABSTRACT

A spindle motor comprises a permanent magnet having an outer diameter, an outer circumference, and a number of poles. A stator core is disposed around and spaced from the outer circumference of the permanent magnet rotor. The stator core has a yoke portion, a number of lengthwise extending and circumferentially spaced slots, and a tooth portion between each adjacent two of the slots. The slots are disposed in close proximity to the outer circumference of the permanent magnet rotor, and a width of each of the slots in a radial direction of the stator core is smaller than a width of the yoke portion and equal to or greater than ¹⁄₂₀ of the outer diameter of the permanent magnet rotor. A coil has two or less turns and is comprised of a conductor disposed in the slots of the stator core.

19 Claims, 5 Drawing Sheets

HIGH SPEED SPINDLE MOTOR AND APPARATUS EQUIPPED WITH HIGH SPEED SPINDLE MOTOR

BACKGROUND OF THE INVENTION

The present invention relates to spindle motors and, more particularly, to high speed spindle motors which rotate at, for example, 10000 rpm or more.

Recently, development is active on spindle motors which rotate at a high speed of 10000 rpm or more. Since high speed spindle motors have high magnetic potential, motors having a permanent magnet provided on the rotor, such as DC brushless motors, are commonly used.

In motors having a permanent magnet, since voltage induced by the permanent magnet increases with an increase in the rotating speed of the rotor, high speed rotation is generally achieved by reducing the number of turns of the stator coil to make the induced voltage constant.

However, since there is a certain limit on the increase in rotational speed that can be achieved by reducing the number of turns, higher rotational speeds have been obtained by expanding the gap between the stator and rotor to decrease the flux density at the gap.

However, expansion of a gap between a stator and a rotor weakens magnetic interaction therebetween which occurs through the gap, thus reducing the torque generated. Therefore, it has not been possible to increase rotational speed and torque simultaneously. This has resulted in poor starting of rotation and it has taken a long time to reach a rated rotational speed. Further, driving efficiency has been low due to significant magnetic loss.

On the other hand, although motors having no permanent magnet on the rotor, such as induction motors and reluctance motors, can also achieve high rotational speeds, it is difficult to obtain high torque at the beginning of operation due to lack of a permanent magnet. Again, it has not been possible to achieve high torque and high rotational speed simultaneously.

SUMMARY OF THE INVENTION

It is an object of the present invention to provide a spindle motor which can be rotated at high speed with high torque.

To accomplish the object described above, the present invention has the structure described below.

The spindle motor has a rotor having a permanent magnet mounted thereon, a rotor core disposed at the outer circumference of the rotor, slots having a width in the radial direction of the rotor core smaller than a return yoke portion, and a coil having a small number of turns constituted by a conductor having a large diameter contained in the slots.

The diameter of the conductor is equal to or greater than 1/20 of the outer diameter of the rotor.

The number of turns of the coil is two or less.

The slots have a multiplicity slots provided for one magnetic pole of the permanent magnet.

The permanent magnet has two magnetic poles.

The slots have a closed slot structure formed unopened at the side of the rotor.

The sectional shape and dimension of the conductor of the coil substantially conform to the shape and dimension of the slots.

In a spindle motor according to the present invention, the width of the slots in the radial direction thereof is smaller than the return yoke portion of the stator core. Therefore, magnetic flux in the stator core circulates in an area close to the rotor, forming a short magnetic circuit.

DETAILED DESCRIPTION OF THE PREFERRED EMBODIMENTS

Embodiments of a spindle motor according to the present invention will now be described in detail with reference to FIGS. 1 through 5.

Figure 1:
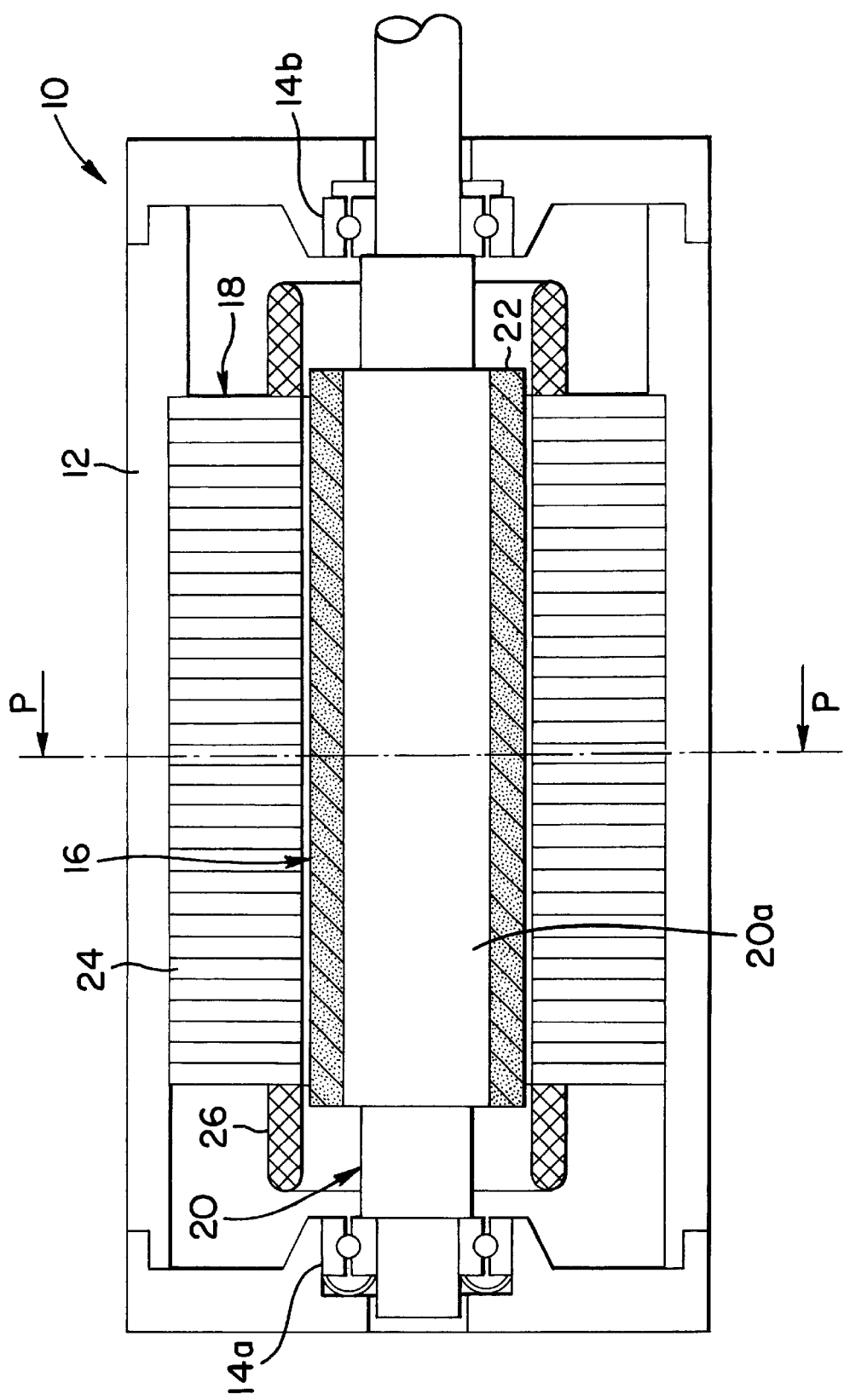
FIG. 1 is a sectional view of a spindle motor according to a first embodiment of the present invention.

FIG. 1 shows a spindle motor according to a first embodiment of the present invention.

As shown in this figure, the spindle motor 10 according to the present embodiment has a motor housing 12, bearings 14a and 14b mounted to one and the other end of the motor housing 12, a rotor 16 rotatably supported by these bearings 14a and 14b, and a stator 18 which surrounds the rotor 16 and which is secured to the motor housing 12.

The rotor 16 is mainly composed of a rotating shaft 20 in the form of a stepped cylinder and a cylindrical permanent magnet 22 mounted to the outer circumferential surface of a large diameter portion 20a of the rotating shaft 20. The permanent magnet 22 is a magnet which forms the field magnetic flux for the stator 18 and which has two poles in the present embodiment.

On the other hand, the stator 18 has a stator core 24 formed by laminating thin, disc-shaped steel plates and a coil 26 wound around the stator core 24. In the present embodiment, the number of turns of the coil 26 is two.

Figure 2:
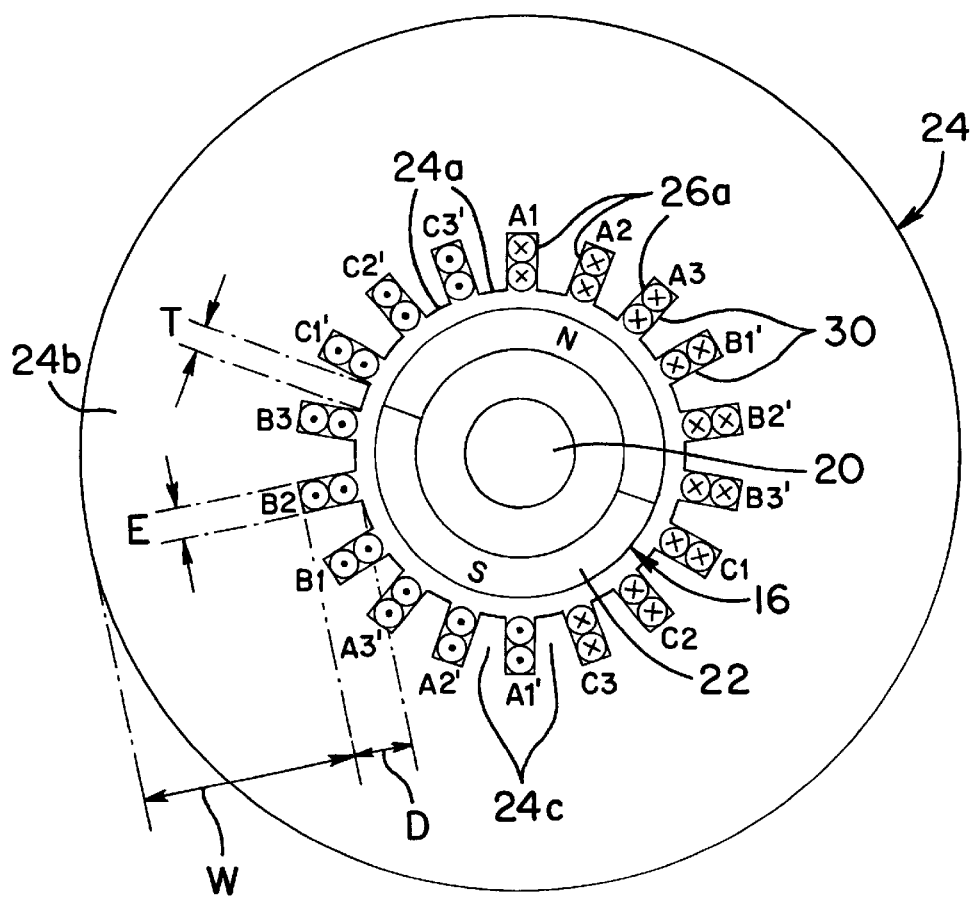
FIG. 2 is a sectional view taken along the line P—P in FIG. 1.

FIG. 2 shows a sectional view taken along the line [P]—[P] in FIG. 1.

As shown in this figure, a plurality of slots 30 which are rectangular cut-outs are formed inside the stator core 24, each slot containing two conductors 26a of the coil 26. The diameter of the conductor 26a is substantially equal to the width E of the slot 30 and is about one-half of the depth D thereof. The gap between the inner conductor 26a and the outer circumferential surface of the permanent magnet 22 is substantially equal to the gap between a tooth top 24a of the stator core 24 and the permanent magnet 22. In other words, the conductor 26a is provided very close to the permanent magnet 22 in the present embodiment.

According to the present embodiment, since the width of the slots 30 in the radial direction, i.e., the depth D is small, a large part of the return yoke 24b is left as a magnetic path at the outer side of the stator core 24. For example, the ratio of the width W of the return yoke portion 24 to the depth D of the slot 30 is about 4:1. Further, the width W of the return yoke portion 24b is four or more times the width T of the tooth tops 24a between the slots 30, and W almost equals 10T in the example shown in FIG. 2. For example, the outer diameter of the stator core 24 is 40–50 mm.

On the other hand, the diameter of the rotor 16 (the outer diameter of the permanent magnet 22) is, for example, as small as about 10 mm in the present embodiment while the diameter of the conductor 26a is about 1 mm. In other words, the conductor 26a has a large diameter, (i.e., the diameter is 1 mm for a rotor 16 having a diameter of about 10 mm) thereby allowing a large current to flow.

The conductors 26a constitute coils of A-, B-, and C-phases indicated by A1–A3, B1–B3, C1–C3 and A1'–A3', B1'–B3', C1'–C3'. As to the order of connection for each phase, for example, the connection in the A-phase is established from A1 to A1' then to A2, A2', A3, and to A3'. Connection between the phases is Δ-connection or Y-connection. A three-phase alternating current is supplied to each conductor 26a by a driving circuit which is not shown, and this generates a rotating magnetic field at the side of the stator 18. FIG. 2 shows the direction of the current at a certain instance during driving, and "○" and "X" shown in each conductor 26a respectively represent a direction toward this side of the paper and a direction toward the other side of the paper.

The operation of the embodiment having such a configuration will now be described.

In the spindle motor 10 of the present embodiment, when the conductors 26a of each phase are energized, they interact with a magnetic field produced by the permanent magnet 22 to produce torque at the permanent magnet 22, which in turn rotates the rotor 16.

Figure 3:
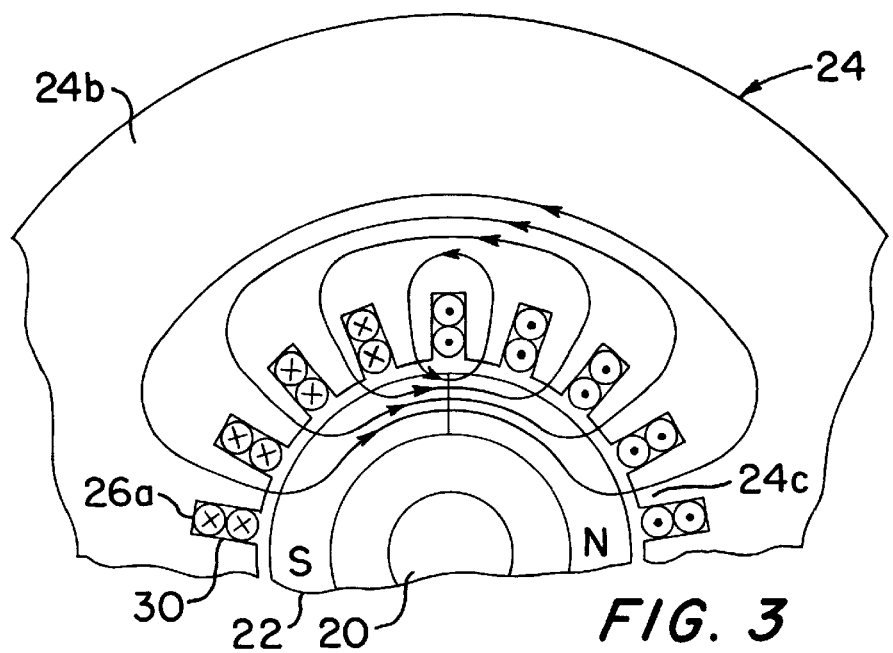
FIG. 3 is the same sectional view as in FIG. 2 showing a magnetic circuit formed during driving.

FIG. 3 shows a magnetic field formed during driving.

When the magnetic poles of the permanent magnet 22 and the current flowing through the conductors 26a are in the positional relationship as shown in FIG. 3, the magnetic flux as indicated by the arrow in FIG. 3 is formed in the permanent magnet 22 and stator core 24. Specifically, since the conductors 26a are provided close to the rotor 16, the magnetic flux circulates in an area of the stator core 24 which is close to the rotor 16, thus forming a short magnetic circuit. The flux density at the return yoke portion 24b at this point is substantially the same as the flux density at pole portions 24c between the slots 30 because the width W of the return yoke portion is four or more times the width T of the tooth top 24a.

As described above, according to the present embodiment, the number of turns of the coil 26 is as small as two, and the diameter of each conductor 26a is large to allow conduction of a large current, i.e., the diameter is 1 mm for a rotor 16 having a diameter of about 10 mm. This makes the induced voltage constant small to allow rotation at a high speed.

Further, according to the present embodiment wherein the magnetic circuit formed during driving is short, the total magnetic resistance in the circuit is small, which results in small magnetic loss. This provides a high flux density at the gap between the rotor 16 and stator core 24 which allows generation of high torque. Although it is difficult to obtain high torque especially with small motors having rotors of small diameters, the present embodiment makes it possible to obtain high torque even with motors of small diameters because of the reduced magnetic loss. In addition, since the rotor of a small motor has small inertia, if a rotor 16 whose diameter is as small as about 10 mm is rotated as in the present embodiment, such small inertia along with increased torque provides excellent acceleration performance. This makes it possible to shorten the starting time significantly compared to the prior art.

Figure 6:
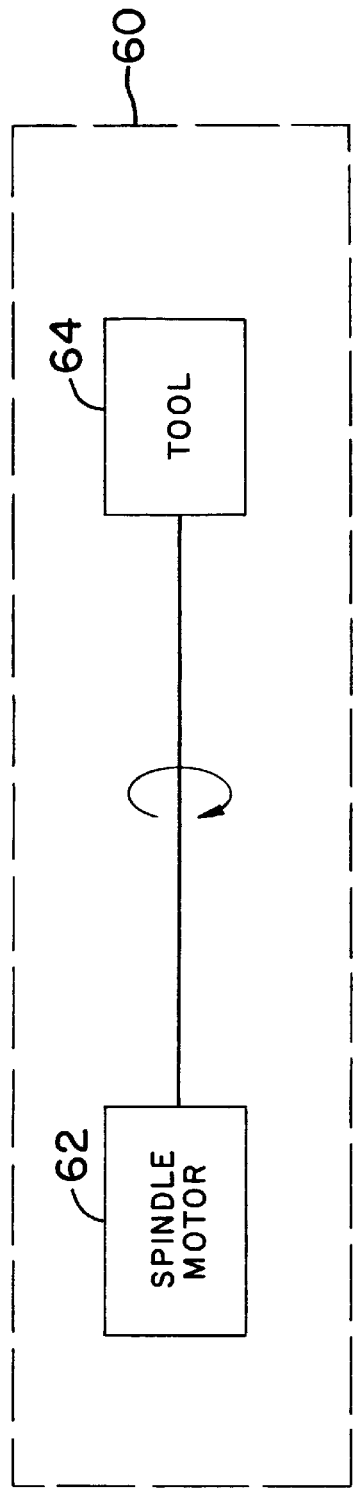
FIG. 6 is a schematic layout of a dental cutting apparatus employing a spindle motor according to the present invention.
Figure 7:
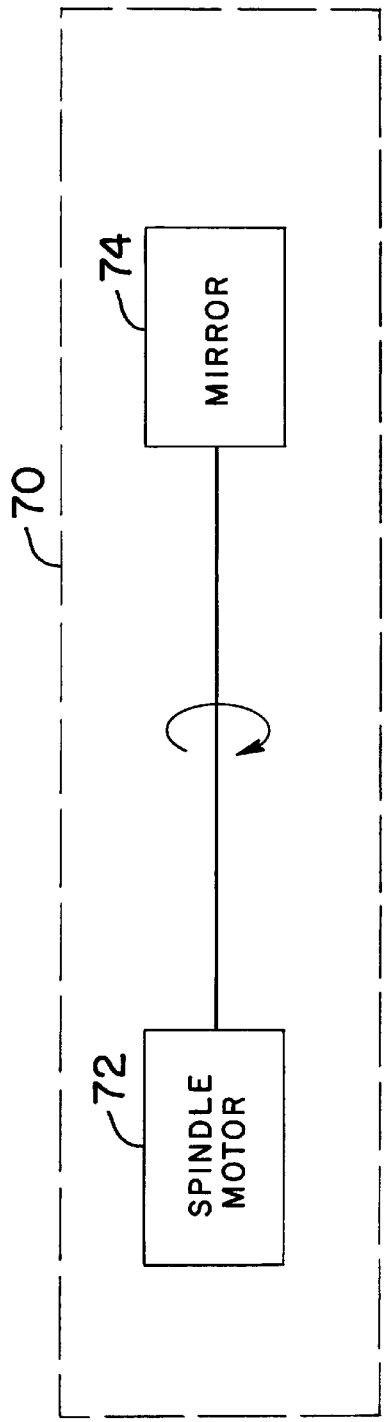
FIG. 7 is a schematic layout of a printer apparatus employing a spindle motor according to the present invention.

Therefore, a spindle motor according to the present embodiment is preferable for applications where a motor having a small diameter must rotate at a high speed. One application, as shown in FIG. 6, is a dental cutting apparatus 60 having a spinde motor 62 according to the present invention for rotationally driving a tool 64. Another application, as shown in FIG. 7, is a printer apparatus 70 having a spindle motor 72 according to the present invention for rotationally driving a mirror 74. For example, rotating tools used for cutting a tooth in dental treatments must rotate at ultra-high speeds such as 80000 rpm, 100000 rpm, 150000 rpm, and 300000 rpm or more and must be small in diameter. The spindle motor 10 according to the present embodiment can be used even in such an application. When used for driving a polygon mirror in a laser printer or the like, the spindle motor 10 according to the present embodiment allows printing to be quickly started because it can reach a rotational speed of 10000 rpm or more in a short period of time.

Moreover, according to the present embodiment, the width W of the return yoke portion 24b of the stator core 24 is larger than the width T of the tooth top 24a (W≧4T). This keeps the flux density at the return yoke portion 24b low and allows the pole portions 24c between the slots 30 and the return yoke portion 24b to have a uniform flux density. This reduces core loss such as hysteresis loss and eddy current loss which is otherwise significant during rotation at a high speed, thus allowing efficient driving with reduced heat generation at the coil 26. For example, efficiency of 80% or higher can be achieved during rotation at a speed as high as tens of thousands rpm or more.

The ratio of the width W of the return yoke portion 24b to the width T of the tooth top 24a may be a ratio other than that in the above-described embodiment, such as 8:1, 6:1, 10:1 or higher, or 20:1 or higher. However, in order to make the flux density at the stator core 24 uniform, the width W must be greater than the product of the number K and the width T of tooth tops 24a for one magnetic pole divided by two (W≧KT/2). For example, W=8T/2=4T in the above-described embodiment wherein there are eight tooth tops 24a for one magnetic pole. Therefore, the flux density at the return yoke portion 24b will never be higher than that at the pole portions 24c if the width W of the return yoke portion 24b is four or more times the width T of the tooth top 24a. The value of the width T is preferably obtained using an equation "T=(MQ−1)/P" if the number of phases M is an odd number equal to or greater than 3 and an equation "T=2(MQ−1)/P" if the number of phases M is an even number equal to or greater than 2, where M represents the number of phases; Q represents the coil pitch; and P represents the number of poles.

Further, in the present embodiment, there is less fluctuation of the permanent magnet 22 relative to the stator core 24 compared to multipolar permanent magnets having four or more poles because the number of the magnetic poles of the permanent magnet 22 is the minimum, i.e. two. This makes it possible to effectively reduce core loss during rotation at a high speed.

In addition, the slots 30 are provided in 18 locations in the present embodiment to form a multi-slot structure associated with one magnetic pole. This allows rotation which is smooth and which has less vibration with less torque ripples.

A second embodiment will now be described. The features identical to those in the first embodiment are indicated by like reference numbers and a detailed description will be omitted for such features as appropriate.

Figure 4:
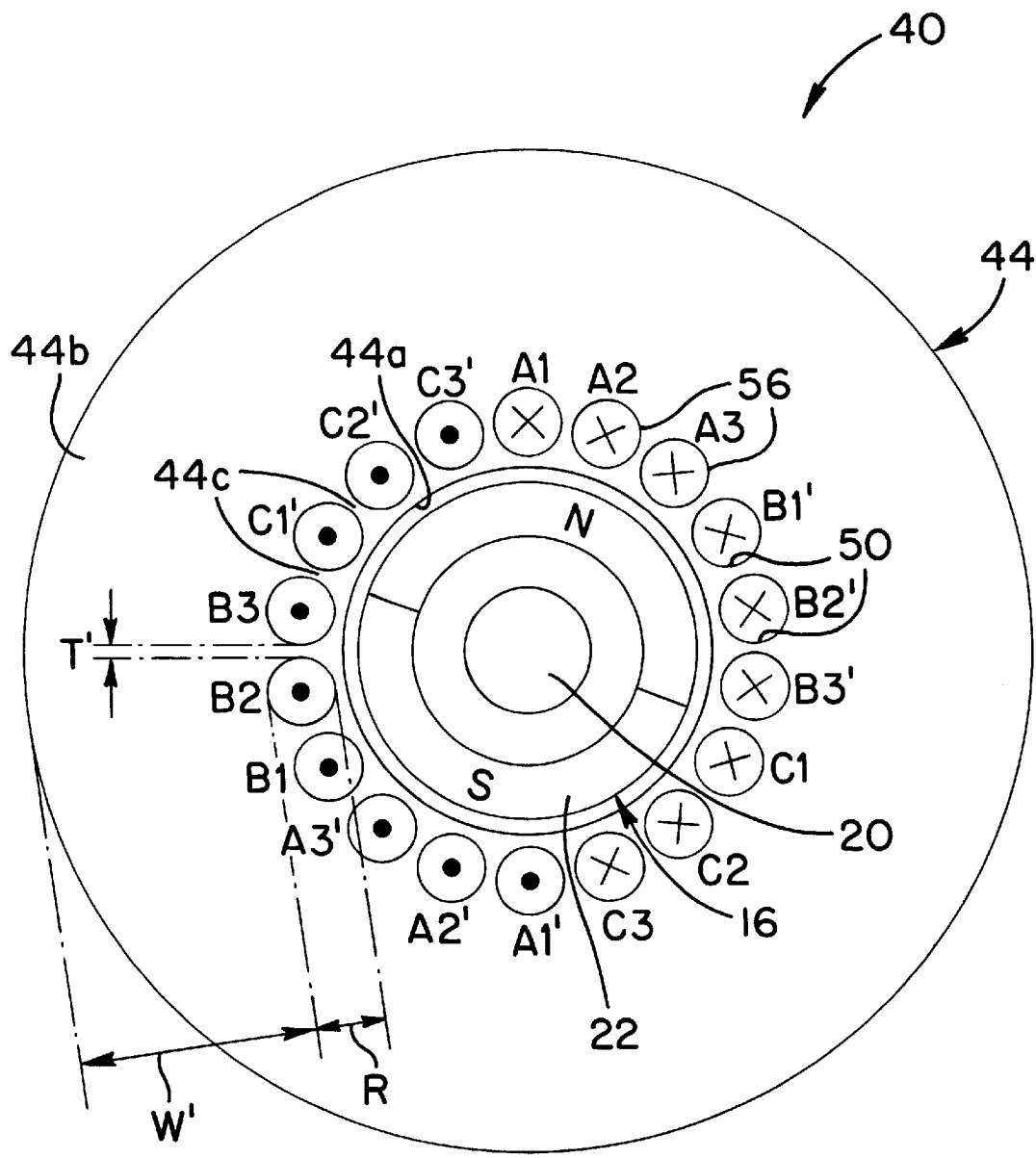
FIG. 4 shows the shape of a core of a spindle motor according to a second embodiment of the present invention.

FIG. 4 shows a sectional view of a spindle motor 40 according to the second embodiment.

According to the present embodiment, slots 50 formed on a stator core 44 are circular holes and have a closed slot structure which is closed at the side of a rotor 16. In other words, the tooth tops of the stator core 44 are connected to each other so that the slots 50 are enclosed by the stator core 44. Each slot 50 contains one conductor 56 of a coil and has a diameter which is substantially equal to the diameter of the conductor 56. The diameter of the conductor 56 is larger than the conductor 26*a* in the first embodiment and is 2 mm or more, for example.

The width T' of pole portions 44*c* located between the slots 50 is one-fourth or less of the width W' of the return yoke portion 44*b* like the first embodiment, and T'≧1/20W' in the example shown in FIG. 4. Further, the slots 50 are formed close to the rotor 16 in the present embodiment, a large part of the return yoke portion 44*b* is left at the outer circumferential portion of the stator core 44. For example, the relationship between the diameter R of the slot 50 and the width W' of the return yoke portion 44*b* is about 1:4.

Like the first embodiment, the conductors 56 form a three phase coil consisting of A-, B-, and C-phases, and a three-phase alternating current is supplied by a driving circuit which is not shown.

When driven, a short magnetic circuit is formed in a position in the vicinity of the rotor 16 as in the first embodiment (see FIG. 3). This makes it possible to generate high torque with reduced magnetic loss.

Further, according to the present embodiment, since the slots 50 have a closed slot structure, a magnetic path is formed at an area where a tooth top of the stator core is connected to another, for example, as indicated at 44*e*. This prevents the flux density from being excessively increased at the area of the tooth tops of the stator core 44, thereby preventing core loss due to an increase in the flux density. Thus it is possible to perform highly efficient driving during rotation at high speeds which causes significant core loss.

Further, according to the present embodiment, the slots 50 and the conductors 56 are in tight contact with each other and no gap is left between them. This makes it possible to form a magnetic circuit which has less magnetic loss compared to the first embodiment and to further increase the flux density at the gap between the stator core 44 and the rotor 16. Therefore, it is possible to obtain torque higher than that available in the first embodiment.

In addition, according to the present embodiment, the number of turns of the coil is small (one turn), and the diameter of the conductors 56 is twice that of the conductors 26*a* of the first embodiment or more. This allows a larger amount of current to flow, thereby allowing rotation at a speed higher than that achievable in the first embodiment.

The configuration, operation, effects, and the like of the present embodiment are otherwise similar to those in the first embodiment.

Figure 5:
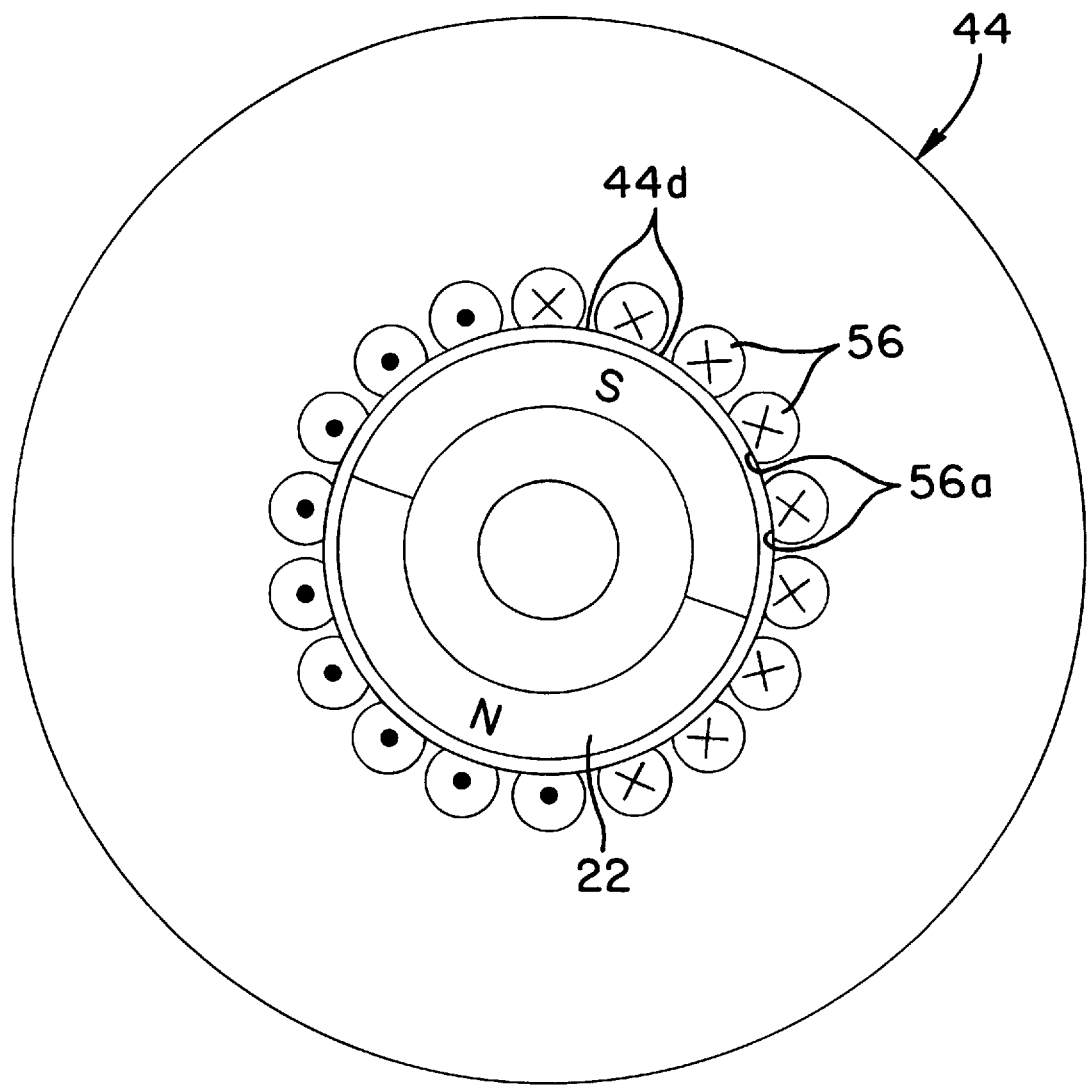
FIG. 5 illustrates a modification of the same core.

A hole 44*a* may be cut in the stator core 44 to expose sections 56*a* of the cut conductors 56 to the permanent magnet 22 as shown in FIG. 5. In this case, since the length of the gap between the permanent magnet 22 and the conductors 56 can be further reduced, the flux density at this gap can be greater than that in the above-described embodiment. As a result, the magnetic stress in the gap uniformly acts on the tooth tops 44*d* of the stator core 44 and the conductors 56, which allows driving at higher efficiency with higher torque.

Although the spindle motors 10 and 40 in the above-described embodiments are motors driven by a three-phase alternating current, it is possible to use motors of a type driven by two-phase alternating current or an alternating current having four or more phases. The permanent magnet 22 is not limited to two magnetic poles but may have four or more magnetic poles. Further, the number of the slots 30 or 50 may be six, nine, or eighteen or more. However, the number of the slots S is determined by a relationship "S=M×P×Q", where M represents the number of phases; P represents the number of poles; and Q represents the coil pitch.

Although the depth D of the slots 30 and the diameter R of the slots 50 are about one-fourth of the width W of the return yoke portion 24*b* and W' of the return yoke portion 44*b*, those dimensions may be increased to, for example, about one-third or one-half. Where the outer diameter of the stator core is kept unchanged, the length of the magnetic circuit formed during driving is proportionate to the width of the slots in the radial direction. Therefore the depth D of the slots 30 and the diameter R of the slots 50 may be made smaller to form a magnetic circuit shorter than those in the above-described embodiments. For example, the depth D and the diameter R may be one-sixth, one-eighth, or one-tenth or less of the widths W and W'. This allows the magnetic resistance to be further reduced, thereby making the above-described effects associated with the reduction of magnetic resistance more significant.

Although the diameters of the conductor 26*a* and the 56 are about one-tenth and one-fifth, respectively, of the outer diameter of the rotor 16 in order to allow a large amount of current to flow through the coil in the above-described embodiments, other ratios may be employed. For example, the ratio may be 1:4 or more, and a ratio on the order of 1/15 or 1/20 can sufficiently provide high speed rotation.

A spindle motor according to the present invention can rotate at a high speed with high torque.

What is claimed is:

1. A spindle motor for high speed rotation, comprising: a permanent magnet rotor having an outer diameter and an outer circumference; a stator core disposed around and spaced from the outer circumference of the rotor and having a return yoke portion and a plurality of slots formed thereon, each of the slots having a width in a radial direction of the stator core smaller than a width of the return yoke portion; and a coil having two turns or less and being comprised of a conductor disposed in the slots in close proximity to the outer circumference of the rotor and having a diameter equal to or greater than 1/20 of the outer diameter of the rotor.

2. A spindle motor according to claim 1; wherein the permanent magnet rotor has two poles, at least one of the poles being disposed opposite at least two slots of the stator core.

3. A spindle motor according to claim 2; wherein the slots are enclosed by the stator core.

4. A spindle apparatus according to claim 2; wherein the slots are distributed over a circumference of the stator core and disposed opposite the outer circumference of the permanent magnet rotor; and wherein the slots are enclosed by the stator core.

5. A spindle motor according to claim 2; wherein the conductor has a dimension and a sectional shape conforming substantially to the dimension and sectional shape of the slots.

6. A spindle motor according to claim 2; wherein the stator core has a plurality of tooth portions each disposed between two of the plurality of slots; and wherein a distance between an end of each of the tooth portions and the outer circumference of the permanent magnet rotor is substantially equal to a distance between an outer surface of the conductor disposed in each of the slots of the stator core and the outer circumference of the permanent magnet rotor.

7. In a dental cutting apparatus having a rotary tool: a spindle motor according to claim 2 for rotationally driving the rotary tool.

8. In a printer apparatus having a polygon mirror: a spindle motor according to claim 2 for rotationally driving the polygon mirror.

9. A motor comprising: a permanent magnet rotor having an outer diameter, an outer circumference, and a plurality of poles; a stator core disposed around and spaced from the outer circumference of the permanent magnet rotor, the stator core having a yoke portion, a plurality of lengthwise extending and circumferentially spaced slots, and a tooth portion between each adjacent two of the slots, the slots being disposed in close proximity to the outer circumference of the permanent magnet rotor, at least one of the poles being disposed opposite at least two slots of the stator core, and a width of each of the slots in a radial direction of the stator core being smaller than a width of the yoke portion and equal to or greater than $1/20$ of the outer diameter of the permanent magnet rotor; and a coil having two or less turns and being comprised of a conductor disposed in the slots of the stator core, a distance between an end of each of the tooth portions and the outer circumference of the permanent magnet rotor being substantially equal to a distance between an outer surface of the conductor and the outer circumference of the permanent magnet rotor.

10. A motor according to claim 9; further comprising means for applying an alternating current having two or more phases to the coil.

11. A motor according to claim 9; wherein at least one of the poles of the permanent magnet has a circumferential extent greater than the sum of the circumferential extent of two adjacent slots and the circumferential extent of the tooth portion between the two adjacent slots.

12. A spindle motor comprising: a rotor assembly having a rotor shaft and a permanent magnet having at least two poles disposed on the rotor shaft; a stator disposed around and spaced from an outer circumference of the permanent magnet and having a plurality of lengthwise and circumferentially spaced slots and a tooth portion between each two slots, at least one of the poles of the permanent magnet having a circumferential extent greater than the sum of the circumferential extent of two adjacent slots and the circumferential extent of the tooth portion between the two adjacent slots; and a coil having two or less windings disposed in each of the slots in close proximity to the outer circumference of the rotor assembly.

13. A spindle motor according to claim 12; wherein the slots are enclosed by the stator core.

14. A spindle motor according to claim 12; wherein each of the windings has a diameter equal to or greater than $1/20$ of an outer diameter of the rotor assembly.

15. A spindle motor according to claim 12; wherein the stator has a yoke portion; and wherein a width of each of the slots of the stator in a radial direction of the stator is smaller than a width of the yoke portion of the stator.

16. A spindle motor according to claim 12; wherein a distance between an end of each of the tooth portions and the outer circumference of the rotor assembly is substantially equal to a distance between an outer surface of each of the windings and the outer circumference of the rotor assembly.

17. A spindle apparatus according to claim 16; wherein the stator has a yoke portion; and wherein a width of the yoke portion is at least four times greater than a width of each of the tooth portions.

18. A spindle apparatus according to claim 17; wherein a width of each of the slots of the stator in a radial direction of the stator is smaller than a width of the yoke portion of the stator.

19. A spindle motor according to claim 12; further comprising means for applying an alternating current having two or more phases to the coil.

* * * * *